United States Patent Office 3,063,360
Patented Nov. 13, 1962

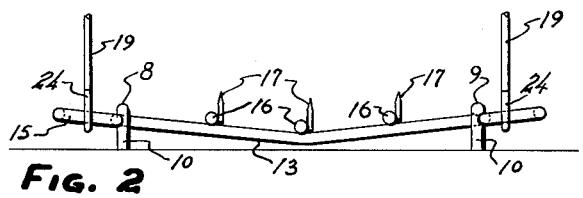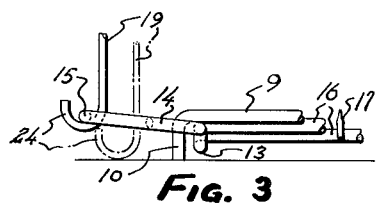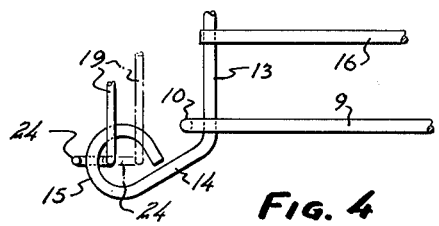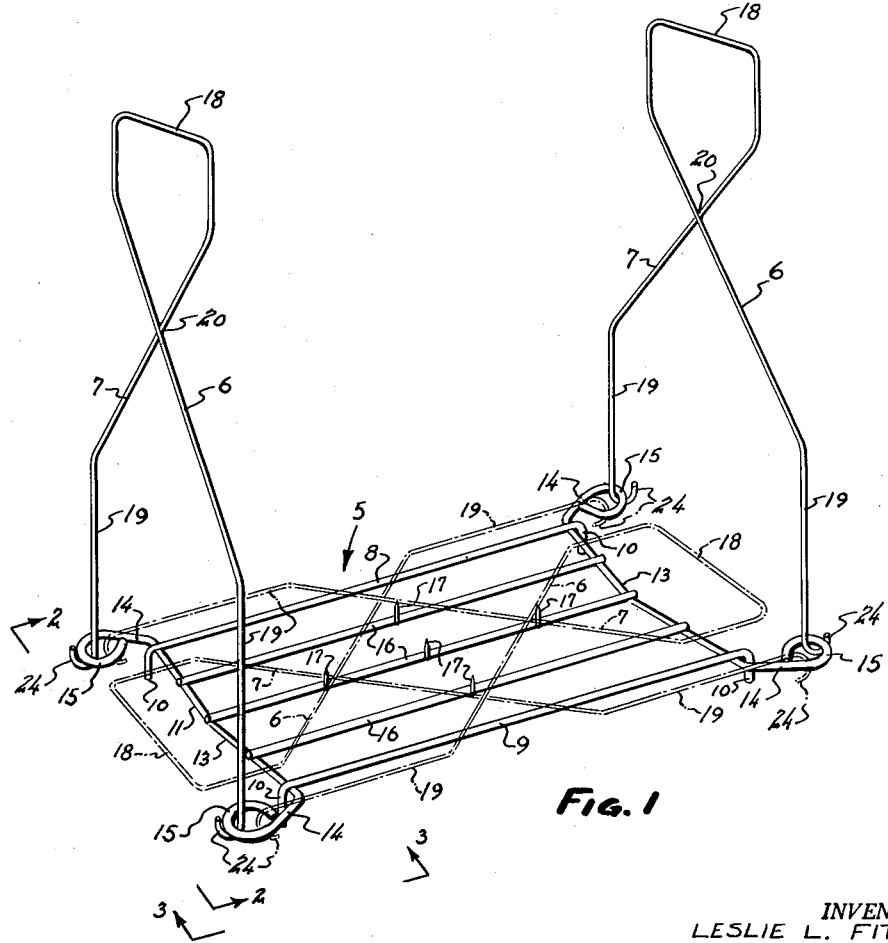

3,063,360
OVEN RACK
Leslie L. Fitch, 29 Conrad St., and Lyle R. Fitch, 321 Forrester St., both of San Francisco, Calif.
Filed Nov. 23, 1959, Ser. No. 854,927
4 Claims. (Cl. 99—419)

This invention relates to an improved transportable roasting rack and more particularly it relates to a rack for supporting meat, fish, or poultry during the cooking and carving process and also in moving the food from roasting pan to the table.

When meat or some type of fowl such as turkey has finished the roasting process, it must be removed from the roasting pan and placed on a firm surface where it can be sub-divided or carved. Prior to the present invention this procedure was a precarious culinary operation and often resulted in injury to the cook, damage to the food, or both. In addition, other aspects of meat handling during the cooking and carving process have long vexed the housewife.

First of all, the meat in direct contact with the bottom of a roasting pan tended to overcook, causing it to stick to the bottom of the pan, and making its removal therefrom more difficult. Secondly, and perhaps the most serious problem was in providing a means to grasp the meat so that it would not slip, fall apart or be unduly punctured in the process of removing it from roasting pan to carving site. The use of forks or skewers was impractical since a firm grip could not be assured and the weight of the meat was often too great. A third problem was in maintaining the meat or fowl in a fixed stable position when the carving process took place by means that did not hinder the carving operation.

A principal object of the present invention is therefore to provide a food rack support that will maintain the roasting meat or fowl in a raised position while in the roasting pan, support it during removal from the pan, and firmly hold it in position during carving.

Another object of the present invention is to provide a novel food supporting and carrying rack having removable handles which are easily attached for lifting the rack and its load from the roasting pan.

Another object is to provide a detachable food rack having removable handles which nest on the rack when not in use so that the rack requires a minimum of space.

Another object is to provide a strong food supporting rack of simple light-weight construction that is equipped with pickup members adapted to receive the hooks of detachable handles.

Other objects and advantages will appear as the description proceeds, when taken in connection with the accompanying drawings in which:

FIG. 1 is a view in perspective of the food supporting and carrying device with the removable handles in the lifting position. The handles are also shown in phantom in the nested position when the rack is stored.

FIG. 2 is a fragmentary end view in elevation taken along the line 2—2 of FIG. 1.

FIG. 3 is a fragmentary view in side elevation showing the relative position and clearances of the handle hook and the lifting eye of the rack.

FIG. 4 is a fragmentary plan view of the handle and rack shown in FIG. 3 showing clearance of the handle hook within the eye.

The preferred embodiment of our invention is shown in FIG. 1 wherein the support rack 5 is shown while being lifted by the detachable handles 6 and 7.

The structure of rack 5 comprises two longitudinal frame members 8 and 9 which curve downward at each end to form legs 10 of equal length which support the rack 5 firmly when it rests on a flat surface. The legs 10 enable the food on the rack 5 to be maintained at a fixed distance from the surface of the pan during roasting so as to avoid burning and subsequent sticking of the meat to the pan.

The longitudinal frame members 8 and 9 are arranged to lie perpendicular to and on top of end cross members 11 and 12 and are permanently attached thereto by some well known means such as welding. In the preferred form of the invention the longitudinal members 8 and 9 cure over the end cross members 11 and 12 at the point adjacent the legs 10.

The end cross members 11 and 12 are slightly V-shaped as seen in the elevation view of FIG. 2 so that they have a cradling effect which aids retaining the meat on the rack 5. In plan view the end cross members 11 and 12 are seen to have a main center section 13 and angled integral end portions 14. The end portions 14 of each end member 11 as shown in FIG. 1 are bent outwardly to form an angle of approximately 60° with the axis of the main center section 13 and the extremity of each end portion 14 is curved around to form a closed or nearly closed loop or eye 15.

The eyes 15 are strategically located to afford the most convenient access to the handles 6 and 7, being at the extreme corners of the rack 5 so that the food being cooked can be placed on the rack 5 without covering up the eyes 15. It is of course, possible to vary the position of the eyes 15 where a larger sized rack is desired, using the same basic configuration of the invention by lengthening the end portions 14 of the end cross members 11 and 12.

Longitudinal members 16 are also welded on cross members 11 and 12 and provide the necessary grill effect to support practically any size of meat or fowl that would be used. Of course, any number of longitudinal members 16 may be used and their spacing is not critical.

Welded to each longitudinal member 16 are impaling tines 17 which pierce the meat or fowl when it is placed on the rack 5 and thus hold it in position during the carving process. While we have shown only 5 tines 17, any number can be used and by keeping them short, i.e., not over ½ inch in length, no interference is encountered during carving.

In constructing the rack 5 we have found it convenient to use metal rod stock of circular cross-section of approximately 3/16 in. diameter. Chrome-plating of the rack 5 and handles 6 and 7 adds a surface appearance which is pleasing to the eye as well as keeping the racks free from corrosion and easy to clean.

The handles 6 and 7 of the food rack 5 are made from similar rod metal stock. We prefer to use material of a slightly smaller diameter of approximately ⅛ inch which is chrome-plated in like manner to the rack 5. Each of the handles, 6 and 7 are made from a single piece of material bent to form an upper horizontal grip portion 18. From the ends of the grip 18 the handles 6 and 7 bend inwardly to cross over at a point 20 and then extend downwardly to form substantially parallel arm members 19. Each crossover point 20 is welded to assure the structural rigidity of the handles 6 and 7, and the mainentance of a predetermined distance between the arm members 19 which is essential to assure easy attachment of the handles 6 and 7 to the rack 5. Of course, other well known means may be employed to keep the arm members 19 properly spaced such as a ring or clip around the crossover point 20. The ends of each arm member 19 on each handle 6 and 7 are turned upward to form semi-circular hooks 24. As shown in FIG. 4, the outside diameter of the hooks 24 is less than the inside diameter of the rack eye members 15 so that the hooks 24 may easily be inserted within the eyes 15 to attach the handles 17 and 18 and lift the rack 5.

In operation, the meat or fowl is placed on the rack 5 and with a handle 6 or 7 in each hand, the hooks 24 of each handle arm member 19 are inserted into the appropriate eyes 15 on each end of the rack 5. With the handles 6 and 7 in place, the rack 5 is lowered into the roasting pan after which the handles 6 and 7 are easily removed while the cooking process is taking place. Upon completion of the cooking process, the handles which have not been exposed to the oven heat are conveniently inserted into the eyes 15 of the rack 5 which is then easily lifted from the roasting pan and moved to a convenient place for carving. During the carving process, the tines 17 and the cradle shape of end cross members 11 and 12 hold the meat firmly in any desired position thus avoiding the problem of slippage.

The present invention provides a highly useful cooking rack which not only provides a firm support for the meat or fowl during cooking or carving but solves, in a unique manner the practical problem of lifting the roast from the pan. When not in use, the handles 6 and 7 of the novel roasting rack 5 lie in a neat nested position on the rack 5 for easy storing, as shown in the phantom lines of FIG. 1.

To those skilled in the art to which this invention relates, many changes in construction and widely differing embodiments and applications of this invention will suggest themselves without departing from the spirit and scope of the invention. The disclosures and the description herein are purely illustrative and are not intended to be in any sense limiting.

We claim:

1. A meat supporting and carrying utensil providing a retaining rack having handle portions removably attached thereto, said rack comprising main longitudinal bar members providing an open rack-frame with certain of said bar members being longer than others and turned adjacent their ends to provide supporting legs for said rack-frame, said rack-frame also including a cross bar member rigidly secured to each of said main parallel bar members adjacent opposite ends thereof, said cross bar members each being slightly V-shaped in elevation to support said main longitudinal bar members in progressively descending relationship toward the longitudinal center of said rack-frame, and said cross bar members each being of materially greater length than the width of said rack-frame and having their extending end portions oppositely turned into substantially closed loops projecting beyond the sides and end portions of said rack-frame, a handle bar member for each end of said rack-frame having an intermediate hand grip portion and a leg portion depending from each side of said hand grip portion, and the free end of each leg portion being turned upon itself to form a hook end swingably engaged with the extended loop ends of said cross bars beyond each end of said rack-frame.

2. The utensil of claim 1, wherein said loop portions at each end of said rack-frame extend outwardly at an angle from the center line of each cross bar member so that the hook ends swingably engage at the extreme outer corners of said rack-frame.

3. The utensil of claim 1, wherein certain of said main longitudinal bar members have a tine rigidly attached thereto to hold and position meat on said rack-frame.

4. The utensil of claim 1, wherein the depending leg portions of said handle bar members are crossed and rigidly attached to each other intermediate the ends thereof.

References Cited in the file of this patent

UNITED STATES PATENTS

| | | |
|---|---|---|
| 361,742 | Bennett | Apr. 26, 1887 |
| 1,012,869 | Lauzon | Dec. 26, 1911 |
| 1,616,043 | Haneklaus | Feb. 1, 1927 |
| 1,630,188 | Knauff | May 24, 1927 |
| 1,909,566 | Bender | May 16, 1933 |
| 2,205,064 | Irwin | June 18, 1940 |
| 2,425,604 | Eckhoff | Aug. 12, 1947 |
| 2,565,046 | Rooth | Aug. 21, 1951 |
| 2,584,295 | Sanzenbacher | Feb. 5, 1952 |
| 2,613,978 | Maeulli | Oct. 14, 1952 |
| 2,616,360 | Thompson | Nov. 4, 1952 |
| 2,703,046 | Ahlquist | Mar. 1, 1955 |